US012162681B2

(12) United States Patent
Bigari et al.

(10) Patent No.: US 12,162,681 B2
(45) Date of Patent: Dec. 10, 2024

(54) VEHICLE SUSPENSION SYSTEM, CONVEYOR SYSTEM, AND AUTONOMOUS VEHICLES INCORPORATING THE SAME

(71) Applicant: GPCP IP Holdings LLC, Atlanta, GA (US)

(72) Inventors: Richard J. Bigari, Suamico, WI (US); Natasha de Gunten, Doraville, GA (US); Michael J. Maes, De Pere, WI (US); Brian Borowski, Suamico, WI (US)

(73) Assignee: GPCP IP Holdings LLC, Atlanta, GA (US)

( * ) Notice: Subject to any disclaimer, the term of this patent is extended or adjusted under 35 U.S.C. 154(b) by 257 days.

(21) Appl. No.: 17/661,660

(22) Filed: May 2, 2022

(65) Prior Publication Data

US 2022/0371822 A1   Nov. 24, 2022

Related U.S. Application Data

(60) Provisional application No. 63/190,506, filed on May 19, 2021.

(51) Int. Cl.
B65G 1/04 (2006.01)
(52) U.S. Cl.
CPC .................. B65G 1/0492 (2013.01)
(58) Field of Classification Search
CPC .................................................. B65G 1/0492
See application file for complete search history.

(56) References Cited

U.S. PATENT DOCUMENTS

| 2,811,370 | A | 10/1957 | Paul |
| 3,366,398 | A | 1/1968 | Mulhoiland |
| 3,584,892 | A | 6/1971 | Moore |
| 5,096,355 | A | 3/1992 | Schroeder |
| 7,300,064 | B2 | 11/2007 | Johnson |
| 10,280,000 | B2 | 5/2019 | Sullivan |
| 10,780,929 | B2 | 9/2020 | Moulin |
| 2005/0191160 | A1* | 9/2005 | Melin ................ B65G 1/0485 414/495 |

(Continued)

FOREIGN PATENT DOCUMENTS

| WO | 2020096112 A1 | 5/2020 |
| WO | 2021019383 A1 | 2/2021 |

OTHER PUBLICATIONS

Extended European Search Report received for EP application No. 22174417.0, mailed on Oct. 17, 2022, 10 pages.

*Primary Examiner* — Saul Rodriguez
*Assistant Examiner* — Willie W Berry, Jr.

(57) ABSTRACT

A vehicle that includes a first rotatable frame that includes a first wheel assembly and a second wheel assembly. The vehicle also includes a second rotatable frame that includes a third wheel assembly and a fourth wheel assembly. The vehicle further includes a base frame configured to support a weight-bearing load. The vehicle further includes an axle member engaging the first rotatable frame, the second rotatable frame, and the base frame, wherein the first rotatable frame is rotatable about the axle member relative to the base frame and independent of the second rotatable frame, and the second rotatable frame is rotatable about the axle member relative to the base frame and independent of the first rotatable frame.

20 Claims, 12 Drawing Sheets

(56) References Cited

U.S. PATENT DOCUMENTS

| | | | |
|---|---|---|---|
| 2016/0016732 A1* | 1/2016 | Koide | B65G 1/137 414/807 |
| 2020/0114714 A1 | 4/2020 | Doan | |
| 2020/0198947 A1 | 6/2020 | Chow | |

* cited by examiner

VEHICLE SUSPENSION SYSTEM, CONVEYOR SYSTEM, AND AUTONOMOUS VEHICLES INCORPORATING THE SAME

CROSS-REFERENCE TO RELATED APPLICATIONS

This application claims priority to and the benefit of U.S. Provisional Application Ser. No. 63/190,506, filed May 19, 2021; the entire contents of which as are hereby incorporated herein by reference.

BACKGROUND

Exemplary embodiments of the disclosure generally relate to an autonomous vehicle, and more particularly, to a vehicle suspension such as for an autonomous vehicle.

Autonomous vehicles are equipped with technologies that enable them to navigate their environment with little to no human guidance. As sensor and processing technologies become more advanced, autonomous vehicles can be deployed to a greater variety of environments and to perform a greater variety of functions. As challenges related to the new environments and functions arise, opportunities exist for various solutions to resolve the challenges.

BRIEF SUMMARY

According to embodiments, an autonomous vehicle is provided that is equipped for autonomous navigation and for transport of large-sized items, such as rolls of sheet products, whether in compressed, uncompressed, coreless, 'parent' rolls, or other forms. Sheet products, such as tissues, towels, napkins, and the like are often wound about a winding axis to form a roll that defines a cavity along the axis. Where a core is present, about which the paper or sheet product roll is wound, the core may include paper, cardboard, plastic, or another rigid or semi-rigid material. For mass-production scaled operations, these rolls of sheet products are large-sized in shape and weight, oftentimes having characteristics up to and/or exceeding 10,000 pounds per roll.

When transport of bulky and/or otherwise oversized items such as rolls of sheet products occurs, safety is important, not only with respect to surrounding structures and personnel, but also with respect to the vehicles providing the transport. Various embodiments described herein thus provide features that facilitate loading and/or unloading of such items, while also ensuring stability of the items during transport and/or navigation of various environments.

According to various embodiments, a vehicle is provided. The vehicle comprises: a first rotatable frame comprising a first wheel assembly and a second wheel assembly; a second rotatable frame comprising a third wheel assembly and a fourth wheel assembly; a base frame configured to support a weight-bearing load; and an axle member engaging the first rotatable frame, the second rotatable frame, and the base frame, wherein the first rotatable frame is rotatable about the axle member relative to the base frame and independent of the second rotatable frame, and the second rotatable frame is rotatable about the axle member relative to the base frame and independent of the first rotatable frame.

In certain embodiments, the base frame comprises an arcuate surface profile configured to receive a cylindrical weight-bearing load. In these and other embodiments, the vehicle may further comprise a conveyor, wherein the base frame is configured to support the weight-bearing load via the conveyor. One or more surfaces of the conveyor may also comprise an arcuate surface profile for securely supporting a cylindrical weight-bearing load received thereon.

According to various embodiments, another vehicle is also provided. This vehicle comprises: a first rotatable frame comprising a first wheel assembly and a second wheel assembly; a second rotatable frame comprising a third wheel assembly and a fourth wheel assembly; a base frame configured to support a weight-bearing load; an axle member engaging the first rotatable frame, the second rotatable frame, and the base frame, wherein the first rotatable frame is rotatable about the axle member relative to the base frame and independent of the second rotatable frame, and the second rotatable frame is rotatable about the axle member relative to the base frame and independent of the first rotatable frame; a receiver for receiving a signal; and a controller for directing a movement of the first wheel assembly based at least in part on a signal received by the receiver, wherein the first wheel assembly comprises a first drive wheel.

In certain embodiments, the controller may be configured for directing bi-directional or multi-directional movement of the vehicle, without regard to distinct front or rear directions relative to the vehicle itself. In these and still other embodiments, the controlled vehicle's base frame comprises an arcuate surface profile configured to receive a cylindrical weight-bearing load. In these and other embodiments, the vehicle may further comprise a conveyor, wherein the base frame is configured to support the weight-bearing load via the conveyor. One or more surfaces of the conveyor may also comprise an arcuate surface profile for securely supporting a cylindrical weight-bearing load received thereon.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the disclosure are apparent from the following detailed description taken in conjunction with the accompanying drawings in which:

Figure 1:
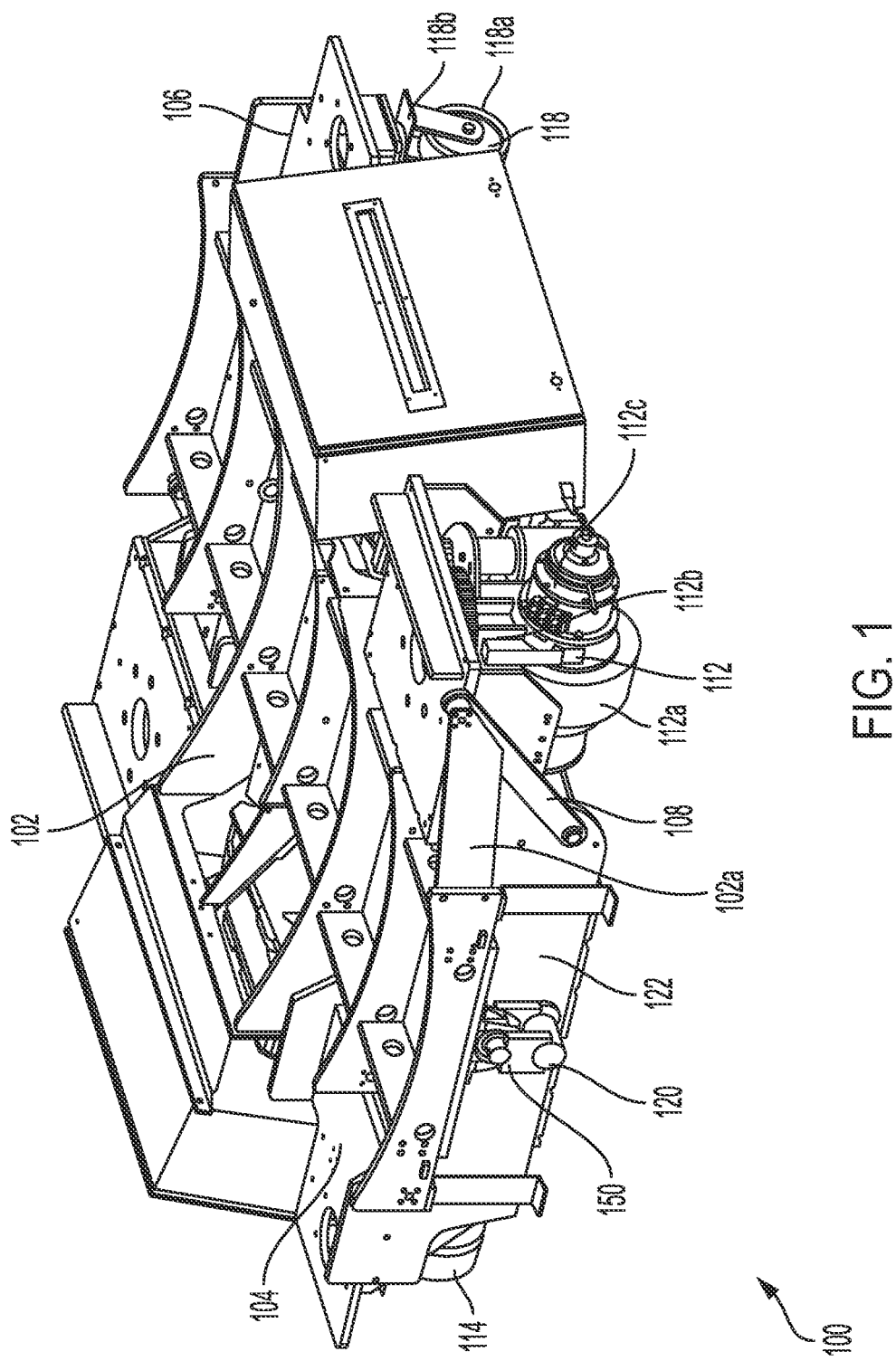
FIG. 1 illustrates a view of a vehicle suspension system in accordance with one or more embodiments of the present disclosure.
Figure 2:
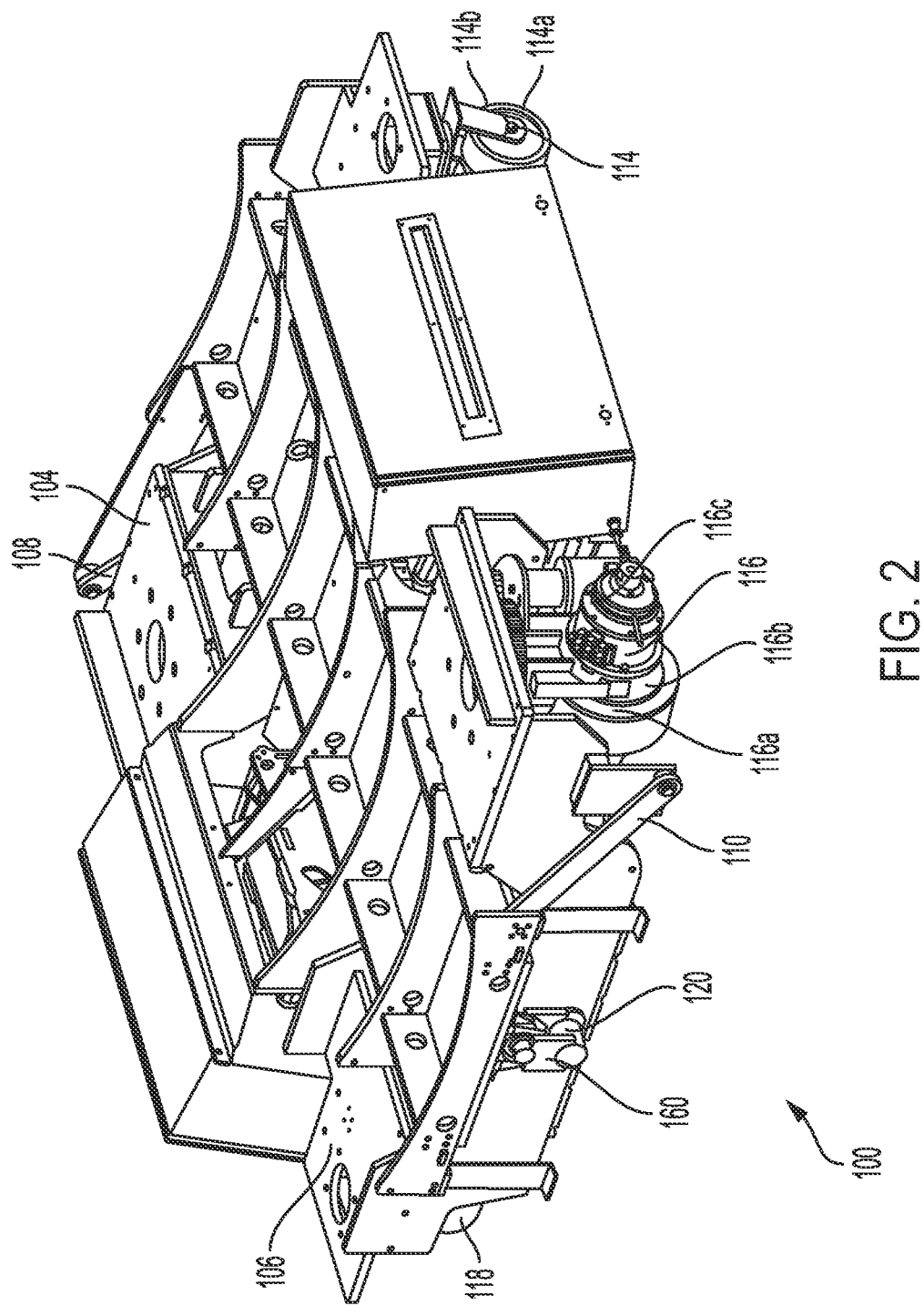
FIG. 2 illustrates a view of a vehicle suspension system in accordance with one or more embodiments of the present disclosure.

The diagrams depicted herein are illustrative. There can be many variations to the diagrams, or the operations described therein without departing from the spirit of the disclosure. For instance, the actions can be performed in a differing order or actions can be added, deleted, or modified. Also, the term "coupled" and variations thereof describes having a communications path between two elements and does not imply a direct connection between the elements with no intervening elements/connections between them. All these variations are considered a part of the specification.

DETAILED DESCRIPTION OF VARIOUS EMBODIMENTS

In manufacturing, industrial, and other environments, vehicles can be used to transport goods and materials and increase the efficiency of enterprise loading, relocating, and/or unloading operations. Certain goods and materials may be bulky and/or otherwise classified as large-sized items requiring transport. One non-limiting example of such large-sized items is 'parent' rolls of sheet products, whether in compressed, uncompressed, coreless, or other forms. Sheet products, such as tissues, towels, napkins, and the like are often wound about a winding axis to form a roll that defines a cavity along the axis. Where a core is present, about which the paper or sheet product roll is wound, the core may include paper, cardboard, plastic, or another rigid or semi-rigid material. For mass-production scaled operations, these rolls of sheet products are large-sized in shape and weight, oftentimes having characteristics up to and/or exceeding 10,000 pounds per roll.

In some scenarios, whether for loading, relocation, and/or unloading of large-sized items such as rolls of sheet products, autonomous vehicles are used. The autonomous vehicles are equipped with navigation systems that enable them to not only traverse routes to predetermined locations, but to adjust paths of travel in a near real-time manner, for example, in response to unexpected obstacles. Further, for load-bearing vehicles, a manner of adjustment is particularly challenging as the vehicle must reach its destination with the load (e.g., a large-sized roll of sheet product) intact. For instance, as a vehicle traverses uneven floor surfaces caused by cracks, depressions, bumps, etc., a load on the vehicle can shift. This can cause damage to the load, the vehicle, and/or the area in proximity to the vehicle.

One or more embodiments of the present disclosure address one or more of the above-described shortcomings by providing an autonomous vehicle with a suspension system in which a front suspension is decoupled from a rear suspension and a load bearing surface. One or more embodiments of the present disclosure thus also address one or more of the above-described shortcomings by providing an autonomous vehicle equipped not only with a suspension system, but also a bi-directional conveyor system. In various embodiments, the load (e.g., a large-sized roll of sheet product, as defined elsewhere herein) may be loaded and/or unloaded, while during movement thereof the front suspension reacts to the surface at the front of the vehicle, the rear suspension reacts to the surface topology at the rear of the vehicle, and the load bearing surface remains level.

Figure 3:
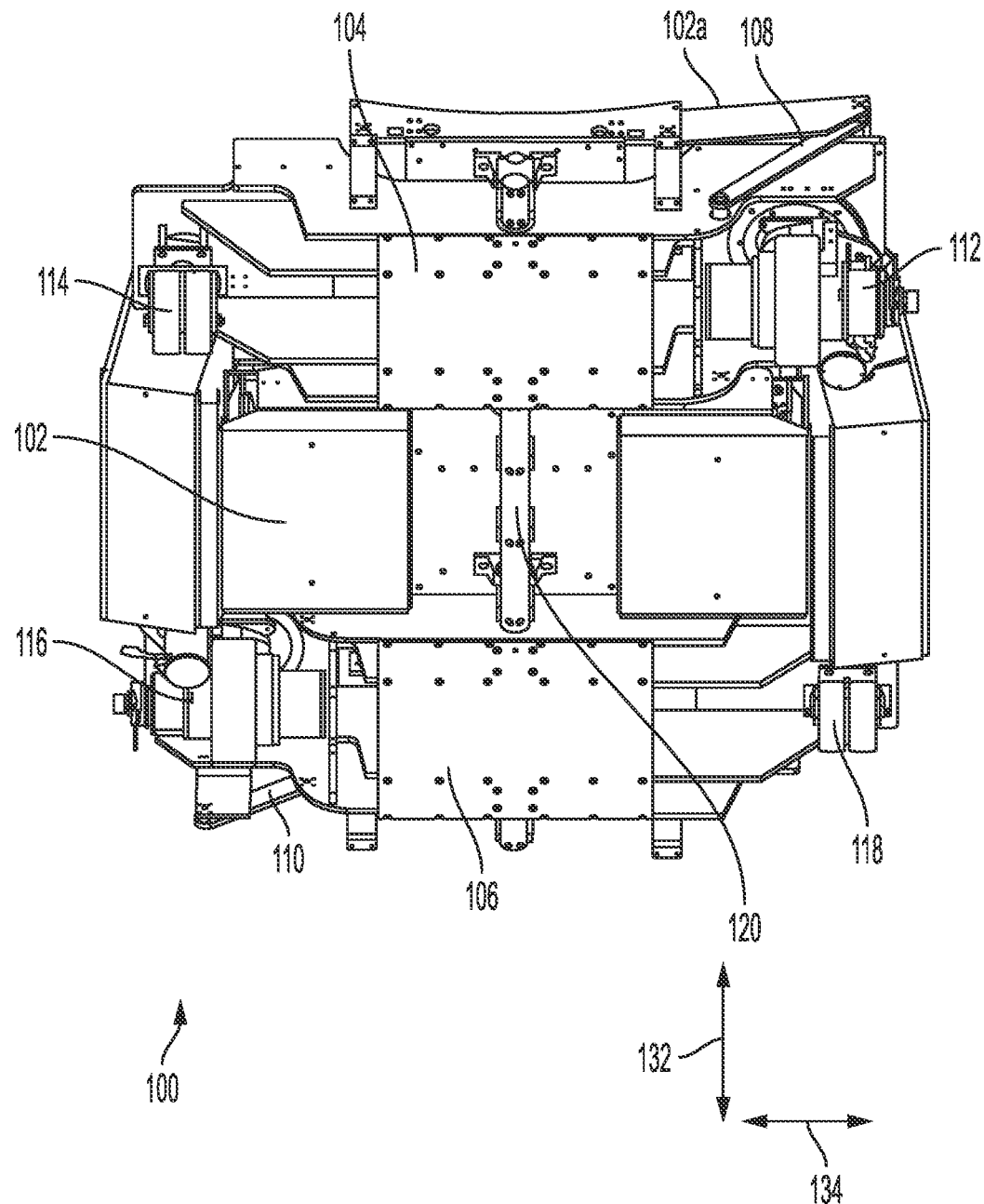
FIG. 3 illustrates a view of a vehicle suspension system in accordance with one or more embodiments of the present disclosure.
Figure 4:
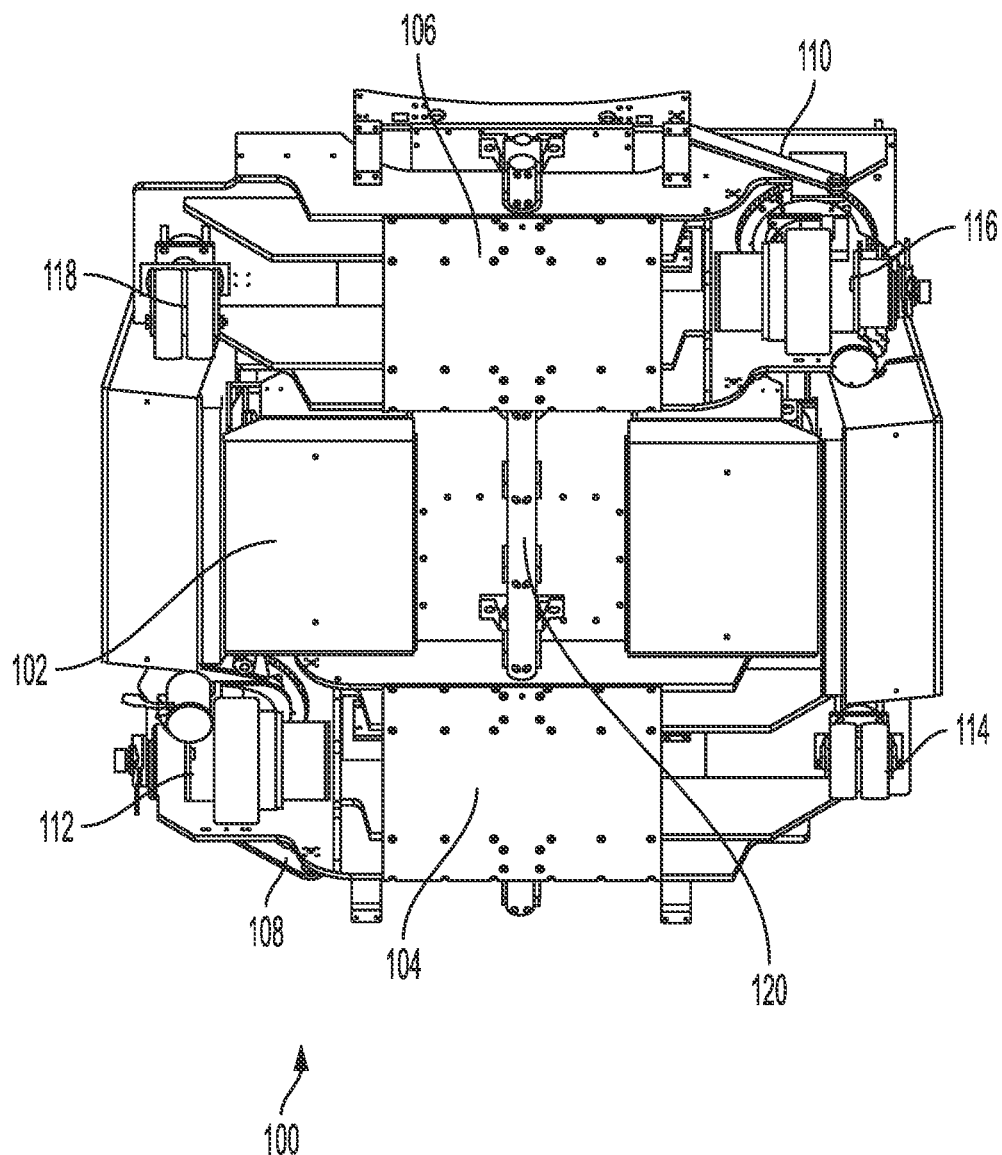
FIG. 4 illustrates a view of a vehicle suspension system in accordance with one or more embodiments of the present disclosure.

Referring to FIGS. 1-4, views of a vehicle suspension system 100 are shown according to embodiments of the present disclosure. According to an example, the vehicle suspension system 100 is part of a self-propelled vehicle 1000 (see FIGS. 9A, 10A, 11A) or 1100 (see FIGS. 9B, 10B, 11B, 12) that can utilize a sensor-based navigation system to travel along a desired path. The vehicle suspension system 100 includes a base frame 102 that is configured to support a weight-bearing load, such as a large-sized roll of sheet product or paper, as detailed elsewhere herein. The base frame 102 is configured to engage a first rotatable frame 104 via a first linkage bar 108 at one end of the base frame 102 and a second rotatable frame 106 via a second linkage bar 110 at a second end of the base frame 102. The first rotatable frame 104 houses a first wheel assembly 112 and a second wheel assembly 114. The second rotatable frame 106 houses a third wheel assembly 116 and a fourth wheel assembly 118. An axle member 120 engages the base frame 102, the first rotatable frame 104, and the second rotatable frame 106. As seen in FIG. 3, the axle member 120 extends along a longitudinal axis 132 of the vehicle suspension system 100 or vehicle 1000 (see FIGS. 9A, 10A, 11A). The first rotatable frame 104 is rotatable about the axle member 120 relative to the base frame 102 and independent of the second rotatable frame 106. Additionally, the second rotatable frame 106 is rotatable about the axle member 120 relative to the base frame 102 and independent of the first rotatable frame 104. The base frame 102, the first rotatable frame 104, and the second rotatable frame 106 are described herein with reference to FIGS. 6 and 7.

The axle member 120 is slidably engaged to the first rotatable frame 104 and the second rotatable frame 106. In some embodiments of the present disclosure, the axle member 120 comprises a rod or a spindle for permitting the rotation of the first rotatable frame 104 and the second rotatable frame 106 independently from each other. A first end of the axle member 120 slides through at least one opening of the first rotatable frame 104, wherein the opening is inward from a respective position of the first wheel assembly 112 and the second wheel assembly 114. According to an embodiment, a tip of the first end slides completely through the first rotatable frame 104 and is exposed. A second end of the axle member 120 slides through at least one opening of the second rotatable frame 106, where the opening is inward from a respective position of the third wheel assembly 116 and the fourth wheel assembly 118. According to an embodiment, a tip of the second end slides completely through the second rotatable frame 106 and is exposed. The first rotatable frame 104 is spaced apart from the second rotatable frame 106 such that a portion of the axle member 120 inward from the first rotatable frame 104 and the second rotatable frame 106 is exposed. The base frame 102 is rotatably engaged to the exposed tip ends of the axle member 120 via a respective first brace link 150 and a second brace link 160. Each of the first rotatable frame 104 and the second rotatable frame 106 are independently rotatable about an axis formed by the axle member 120.

The base frame 102 is respectively connected to the first rotatable frame 104 and second rotatable frame 106 via the first linkage bar 108 and the second linkage bar 110. One end of the first linkage bar 108 is pivotably connected to the first rotatable frame 104 proximate to the first wheel assembly 112. The first linkage bar 108 extends across the first wheel assembly 112 and is pivotably connected at an opposite end to an extended lateral member 102*a* of the base frame 102. The extended lateral member 102*a* extends across the first wheel assembly 112. The second linkage bar 110 is pivotably connected at an end to the base frame 102 proximate to the third wheel assembly 116. The second linkage bar 110 extends across the third wheel assembly 116 and is pivotably connected at an opposite end to the second rotatable frame 106. The first linkage bar 108 and the second linkage bar 110 each are components of respective four-bar linkage systems, which are described in further detail with reference to FIGS. 5A and 5B.

Figure 9B:
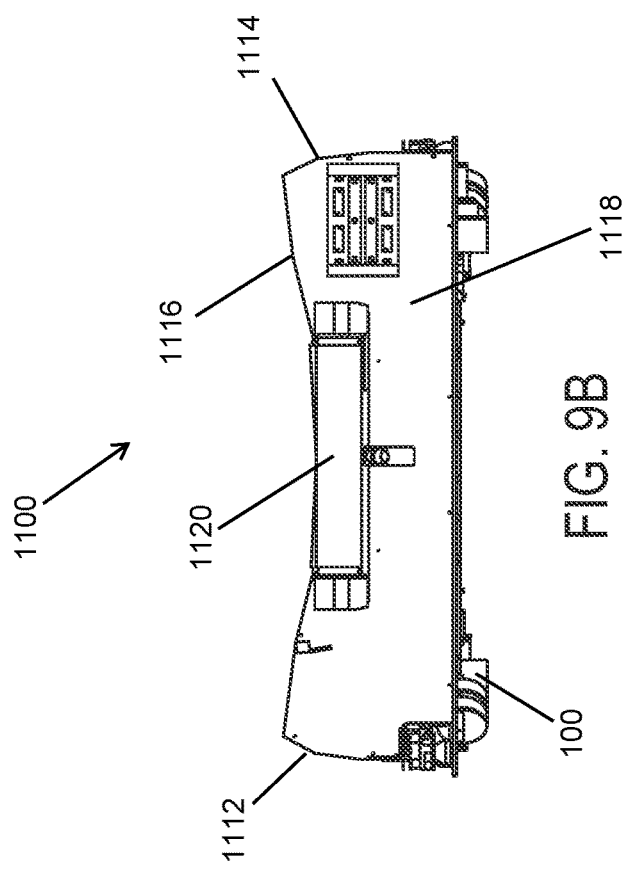
FIG. 9B illustrates a side view of a vehicle incorporating the vehicle suspension system and associated components of FIGS. 1-8 in accordance with one or more embodiments of the present disclosure, further incorporating a conveyor system in accordance also with one or more embodiments of the present disclosure.
Figure 9A:
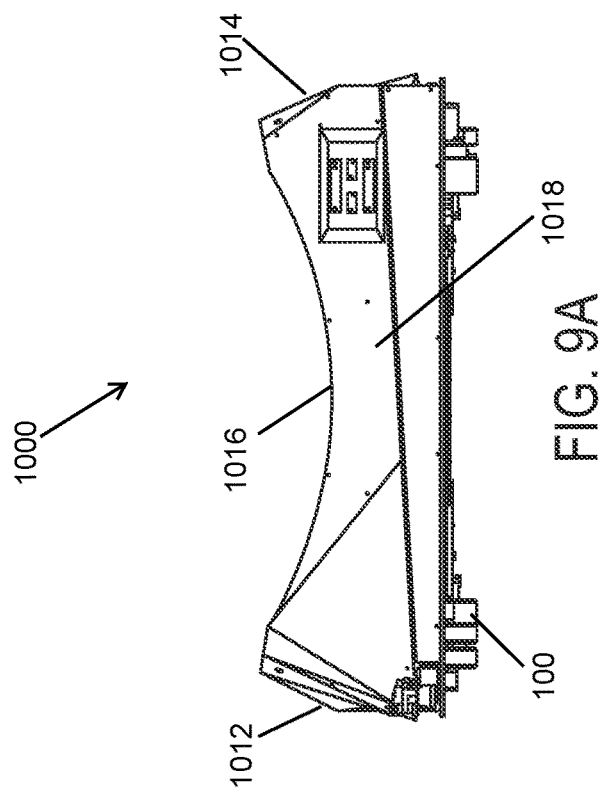
FIG. 9A illustrates a side view of a vehicle incorporating the vehicle suspension system and associated components of FIGS. 1-8 in accordance with one or more embodiments of the present disclosure.
Figure 11A:
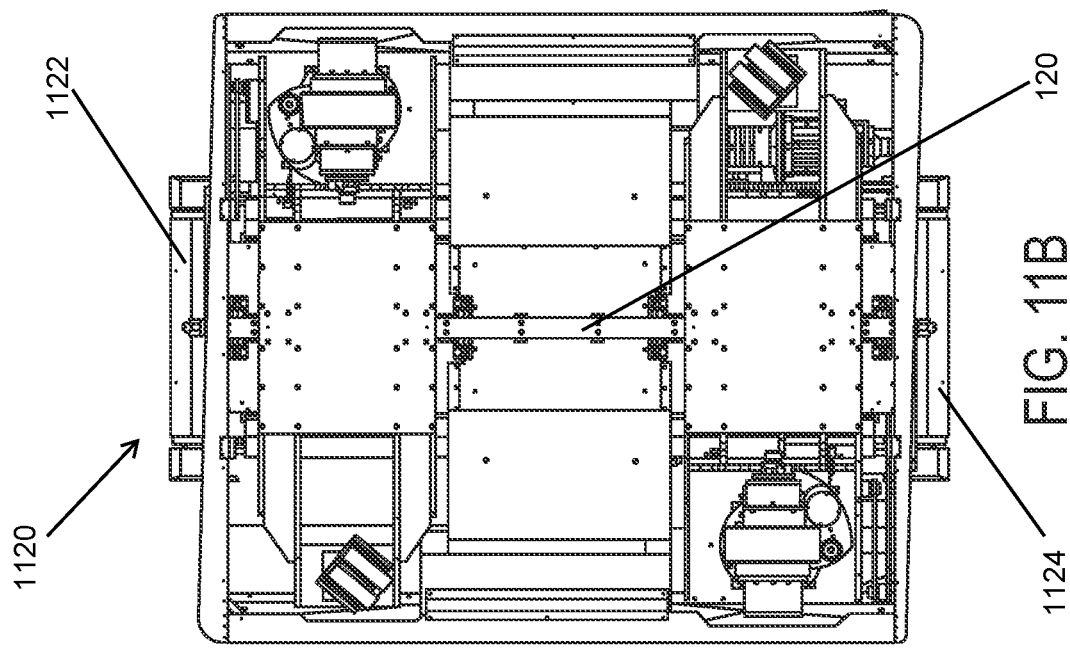
FIG. 11A illustrates a bottom view of the vehicle of FIG. 9A in accordance with one or more embodiments of the present disclosure.
Figure 11B:
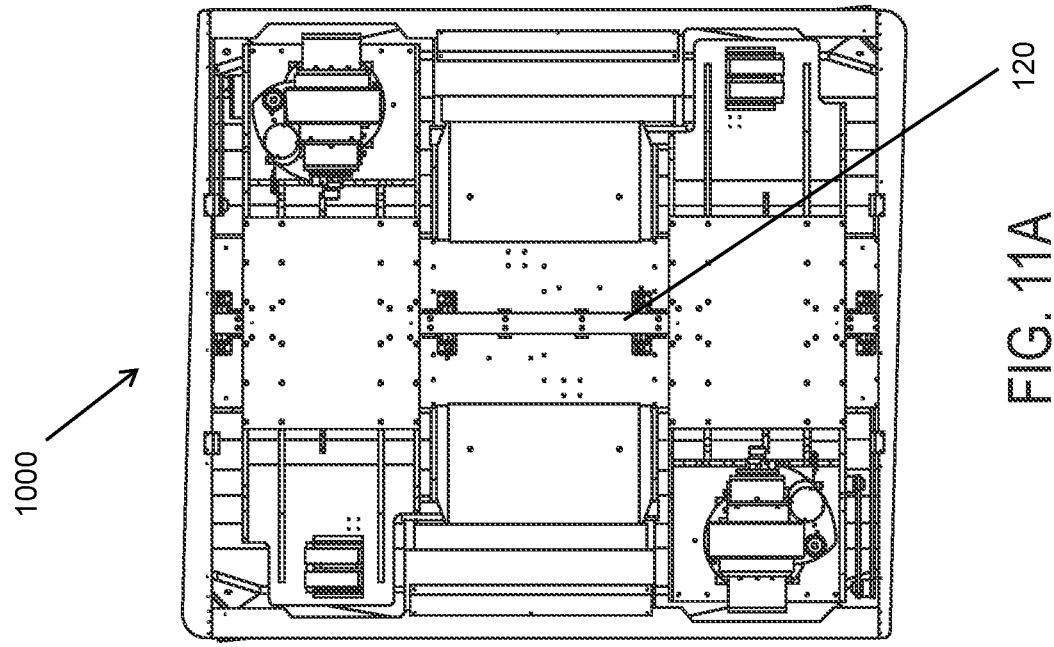
FIG. 11B illustrates a top view of the vehicle of FIG. 9B in accordance with one or more embodiments of the present disclosure.

With reference to FIGS. 9A and 9B, it should be understood that the vehicle suspension system 100 may be incorporated as part of either vehicle 1000 or 1100. In either scenario, the vehicle suspension system 100 may include substantially all the components described and illustrated with respect to FIGS. 1-4, including as non-limiting examples a base frame 102 (see also FIGS. 11A-B), rotatable frames 104, 106, linkage bars 108, 110, wheel assemblies 112, 114, and axle member 120 (see generally FIGS. 11A-B, showing an underside of vehicles 1000 and 1100 and the suspension system incorporated therein. In certain embodiments, one or more components of the vehicle suspension system 100 may differ relative to that described and illustrated with respect to FIGS. 1-4, although not illustrated.

Turning to FIG. 9A specifically, vehicle 1000 may according to various embodiments have an external housing or cover (i.e., encompassing the vehicle suspension system 100 described in FIGS. 1-4). The housing or cover and thus the vehicle 1000 may thus have a front surface 1012, an opposing rear surface 1014, a top surface 1016, and opposing side surfaces 1018. Despite how characterized, it should also be understood that relative to the wheel assemblies 112, 114, 116, 118 described elsewhere herein, the vehicle 1000 is configured for multi- or bi-directional maneuvering, such that no distinct front or back of the vehicle, as conventionally understood need be distinctly defined, other than for purposes of completeness of disclosure. For purposes of comparison below, in certain embodiments, the top surface 1016 of vehicle 1000 may be a continuous or near-continuous top surface. In these and other embodiments, at least a portion of the top surface 1016 may be concave in shape or profile. In at least one embodiment, the portion of the top surface 1016 that is concave in shape or profile is a central portion, so as to facilitate support—and securement for safety and other purposes—of a load, such as a large-sized roll of sheet product or paper.

With reference now to FIG. 9B, vehicle 1100 may be compared with vehicle 1000. Similarities, according to various embodiments, exist with respect to distinct relative surfaces, namely a front surface 1112, an opposing rear surface 1114, a top surface 1116, and opposing side surfaces 1018. Differences, in certain embodiments, also exist, primarily with respect to a discontinuity formed in the top surface 1116. Therein, according to various embodiments is provided a conveyor 1120. The conveyor 1120, according to various embodiments, and as compared with vehicle 1000, is provided and configured to facilitate an improved (i.e., easier) side-based loading and/or unloading of bulky, heavy, or large-sized loads, such as rolls of sheet product weighing up to 10,000 pounds each.

Figure 10B:
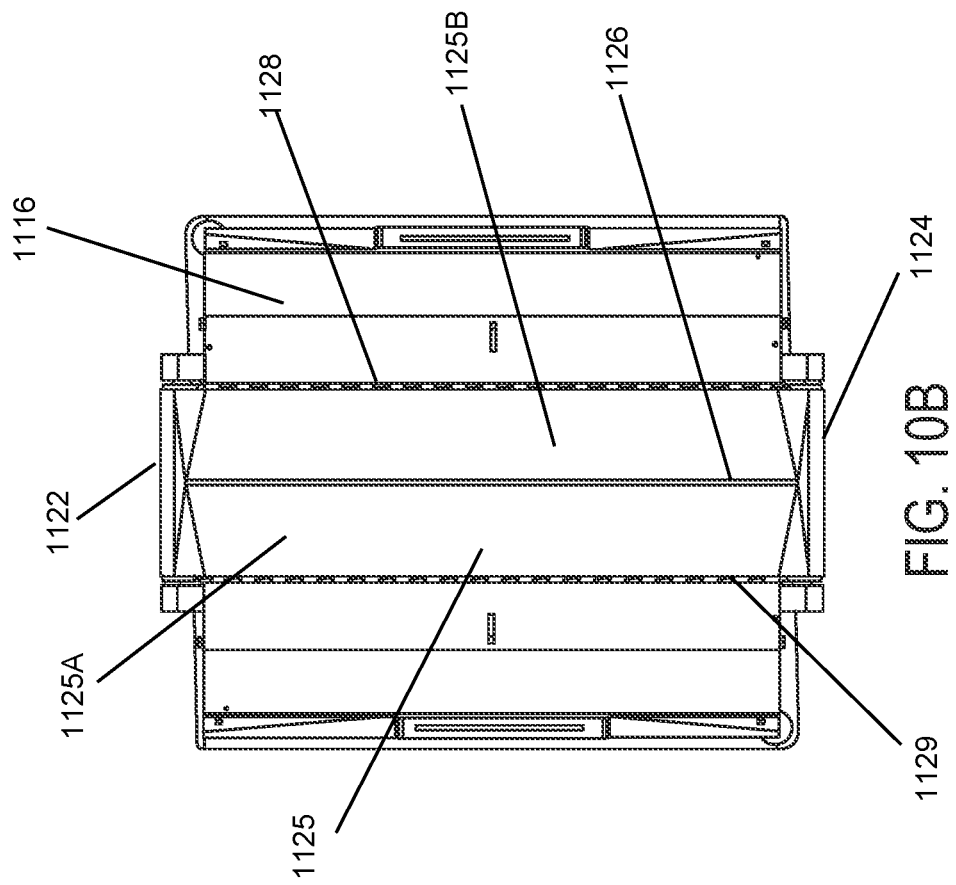
FIG. 10B illustrates a top view of the vehicle of FIG. 9B in accordance with one or more embodiments of the present disclosure.
Figure 10A:
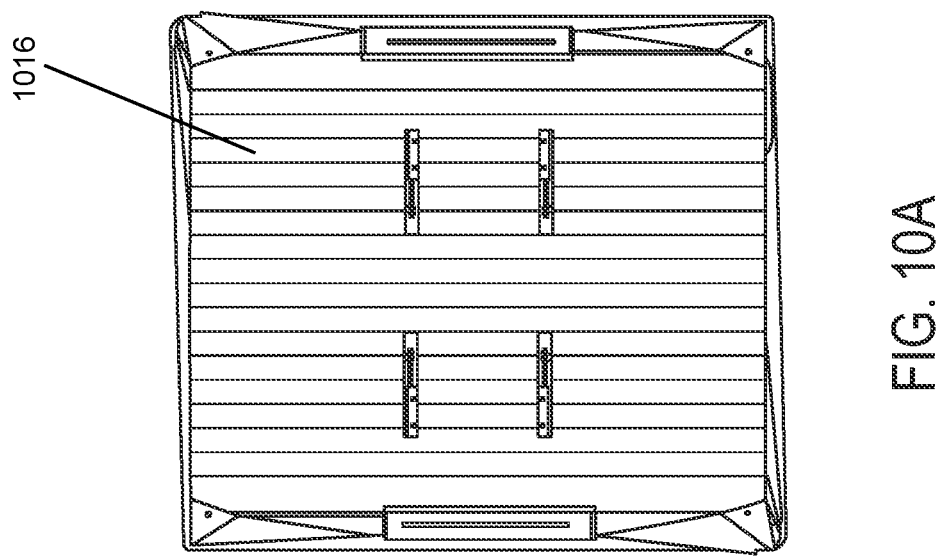
FIG. 10A illustrates a top view of the vehicle of FIG. 9A in accordance with one or more embodiments of the present disclosure.

From FIGS. 10A-B, the differences between the respective top surfaces 1016, 1116 of vehicles 1000, 1100 may be further understood. In FIG. 10B particularly, the orientation and placement of the conveyor 1120 is, according to certain embodiments, such that opposing ends 1122, 1124 thereof are adjacent the opposing side surfaces 1118 of the vehicle 1100 cover or housing. This, amongst other advantages, facilitates an improved side-based loading and/or unloading of large-sized loads. Of course, in other embodiments, the conveyor 1120 may be alternatively positioned, for example extending from the respective front and rear surfaces 1112, 1114, as may be desirable. In these and other embodiments, it should be understood that the conveyor 1120 extends at least an entire length (or width) of the top surface 1116, so as to enable loading on either opposing side surface or the like. Further, although not illustrated, a pair of conveyors 1120 may be provided in certain embodiments, each extending approximately half of the length or width of the top surface 1116; this may permit selective, bi-directional, or differing speed operational characteristics for each conveyor 1120. Even where one conveyor 1120 is provided, selective and/or bi-directional operational characteristics may also be provided, for purposes of indiscriminate loading and/or unloading from either end 1122, 1124 of the conveyor 1120.

Remaining with FIG. 10B, further characteristics of the conveyor 1120 may be understood. For example, according to various embodiments, the conveyor has a width, defined by opposing side edges 1128, 1129 that is less than its length, defined by the opposing ends 1122, 1124. Although providing a continuous top surface 1125 according to various embodiments, the conveyor 1120 may be configured to substantially align with the shape or profile of the top surface 1116. In this manner, the top surface 1125 of the conveyor 1120 may have respective halves 1125A, 1125B oriented differently relative to one another with respect to a central axis 1126 of the conveyor.

In various embodiments, the top surface 1125, by way of the distinct halves 1125A, 1125B, may define a concave profile, so as to provide enhanced support and securement for loads placed thereon. The concave profile of the conveyor 1120 is visible not only in FIG. 10B, but also FIG. 12. In certain embodiments, the concave shape or profile of the top surface 1125 may be substantially continuous. In other embodiments, as seen for example in FIG. 12, a defined conveyor center line may be present (see also central axis 1126 in FIG. 10B). Opposing sides 1125A, 1125B of the top surface 1125 may extend outwardly and upwardly relative from this center line, which may define a lower-most relative height of the conveyor. The outwardly and upwardly extension of the sides of the top surface may be at respective angles ranging from 1 to 25 degrees. In certain embodiments, the angular range may be 1 to 10 degrees; in still other embodiments, the angular range may be variable versus fixed, so as to define the concave profile of the top surface 1125. The angular range may also differ on each side of the top surface, as may be desirable; in any of these and other embodiments, the angling of the top surface and/or the substantially concave profile thereof provide enhanced stability and support for large-sized loads. In at least one embodiment, the concave profile of the top surface may correspond substantially with an exterior profile of a large-side roll of sheet product that may be loaded atop the conveyor.

With reference to FIG. 11B, it may be understood that, according to various embodiments, the conveyor 1120 may be aligned with the axle member 120 of the base frame 102 of the vehicle suspension system 100. In these and other embodiments, the conveyor 1120 may additionally be aligned with the longitudinal axis 132 of the vehicle suspension system 100 (see FIG. 3). Of course, although not explicitly illustrated, the conveyor 1120 may be otherwise aligned with the longitudinal axis 132, including perpendicular relative thereto. The vehicle 1100 of FIG. 11B incorporating a conveyor 1120 thereon may be contrasted and compared with vehicle 1000 of FIG. 11A, where the axle member 120 is also visible.

Figure 12:
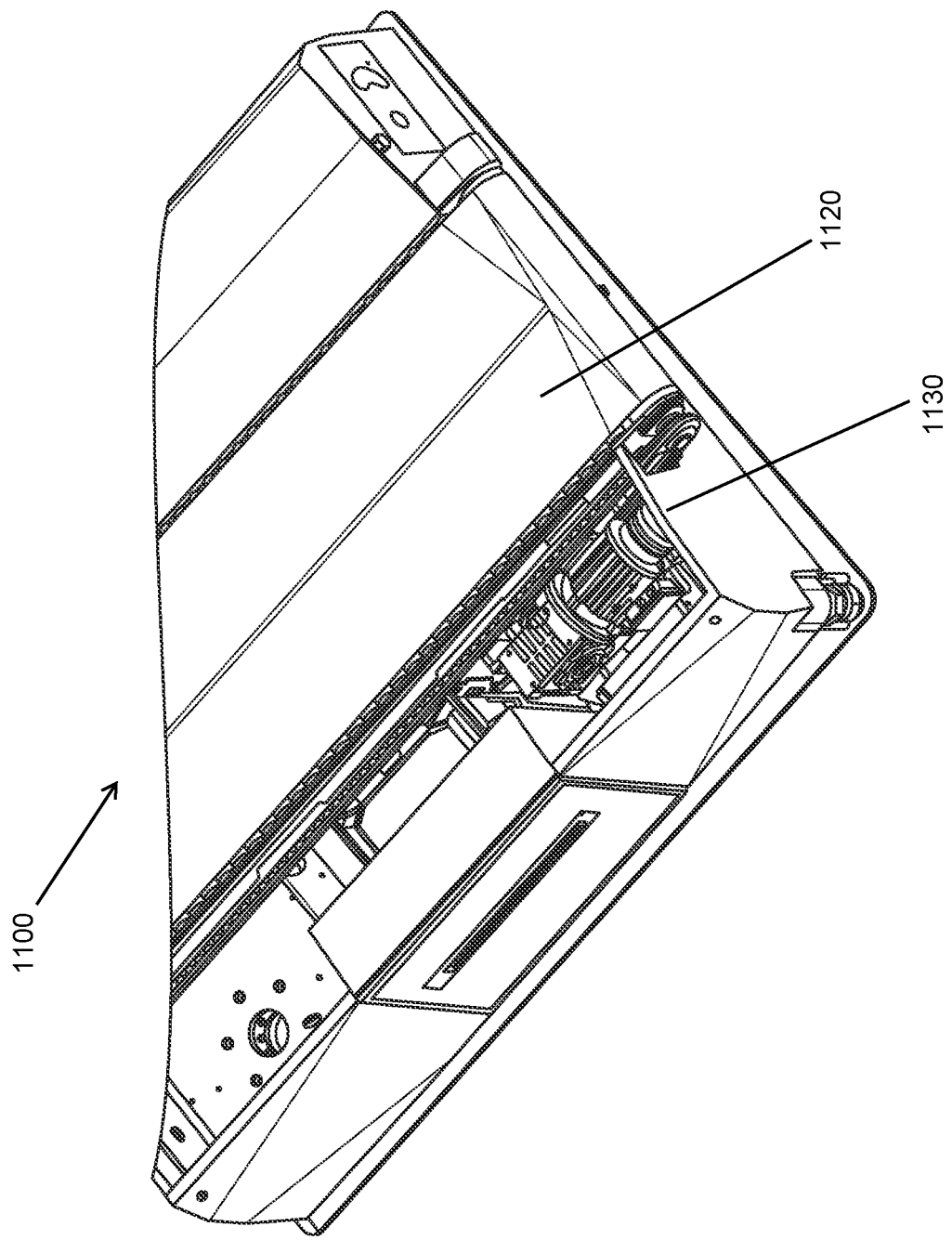
FIG. 12 illustrates a further view of the vehicle of FIG. 9B in accordance with one or more embodiments of the present disclosure.

Turning to FIG. 12, operation of the conveyor 1120 may, according to various embodiments, be achieved via a motor 1130. In certain embodiments, the motor 1130 may be bi-directional, so that it may be selectively adjusted for bi-directional movement of the top surface 1125 of the conveyor 1120 along the length thereof. The motor may, in these and other embodiments, be any model, make, style, and/or type of motor as conventionally known and understood in the art and utilized generally for driving of comparable conveyors or conveyor belt assemblies.

Figure 5A:
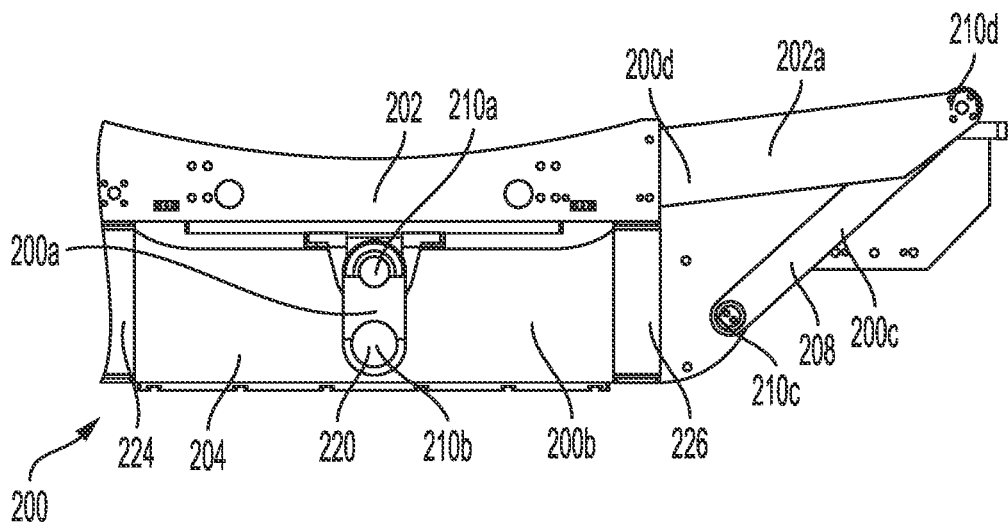
FIG. 5A illustrates a view of a first four-bar linkage system in accordance with one or more embodiments of the present disclosure.
Figure 5B:
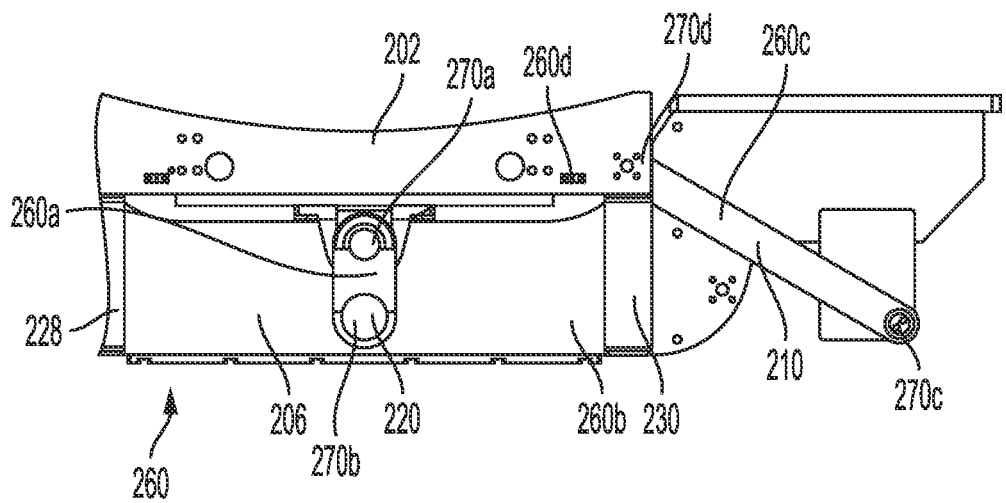
FIG. 5B illustrates a view of a second four-bar linkage system in accordance with one or more embodiments of the present disclosure.

Returning now with reference to FIGS. 5A and 5B, a first four-bar linkage system 200 and a second four-bar linkage system 260 are described, as may be incorporated into either of vehicles 1000 or 1100 (see FIGS. 9A-12 elsewhere herein). Each of the first and second four-bar linkage systems 200, 260 includes linkages pivotably connected at joints to cause a predictable motion and rotational outcome of the base frame 202, the first rotatable frame 204, and the second rotatable frame 206. The first four-bar linkage system 200 and the second four-bar linkage system 260 include respective first link 200a, 260a, second link 200b, 260b, third link 200c, 260c, and fourth link 200d, 260d. These links are connected via first joints 210a, 270a, second joints 210b, 270b, third joints 210c, 270c, and fourth joints 210d, 270d. The respective first links 200A and 260A are solid mounted to the axle member 220 and are rotatable together with the axle member 220 about the same axis. As illustrated in FIGS. 5A and 5B, the third links 200c, 260c are respectively a first linkage bar 208 and a second linkage bar 210.

As the vehicle suspension system 100 as part of either vehicle 1000 or 1100 (see FIGS. 9A-12) traverses an uneven surface, the links of the first four-bar linkage system 200 and the second four-bar linkage system 260 pivot relative to one another to allow the first rotatable frame 204 and the second rotatable frame 206 to dynamically rotate about the axle member 220 to accommodate differences to the surface topology across which the vehicle 1000 or 1100 travels. As the first rotatable frame 204 and the second rotatable frame 206 are independently engaged to the axle member 220, their rotation is independent of each other and of the base frame 202. A rotation of the base frame 202 is further restricted by the first linkage bar 208 and the second linkage bar 210, which limit an angle of rotation of the first rotatable frame 204 and the second rotatable frame 206 relate to the base frame 202 based on their respective lengths. Therefore, as the first rotatable frame 204 and the second rotatable frame 206 rotate, the base frame 202 remains substantially planar relative to a ground surface.

With continued reference to FIGS. 1-4, the vehicle suspension system 100 when part of either vehicle 1000 or 1100 (see FIGS. 9A-12) is configured to support a weight-bearing load and is supported by the first wheel assembly 112, the second wheel assembly 114, the third wheel assembly 116, and the fourth wheel assembly 118. At least one of the first wheel assembly 112 and the third wheel assembly 116 are a drive wheel assembly. The first wheel assembly 112 includes a first wheel 112a rotatably connected to a first rotatable mount 112b, and a first drive motor 112c. The first drive motor 112c can cause the first wheel 112a to rotate about a first horizontal axis. The first drive motor 112c can further cause the first rotatable mount 112b to rotate about a first vertical axis, which in turn causes the first wheel 112a to rotate about the first vertical axis. The first wheel assembly 112 is connected to a first end of the first rotatable frame 104.

In some embodiments of the present disclosure, the third wheel assembly 116 is also a drive wheel assembly and includes a third wheel 116a rotatably connected to a third rotatable mount 116b, and a third drive motor 116c. The third drive motor 116c can cause the third wheel 116a to rotate about a third horizontal axis. The third drive motor 116c can further cause the third rotatable mount 116b to rotate about a third vertical axis, which in turn causes the third wheel 116a to rotate about the third vertical axis. The third rotatable mount 116b is connected to proximate to a first end of the second rotatable frame 106. This movement of the first wheel 112a and/or the third wheel 116a is governed by a controller (not shown) in operable communication with a navigation system (not shown).

Furthermore, in some embodiments of the present disclosure, the first wheel assembly 112 and the third wheels assembly 116 drive wheels are arranged on opposite lateral positions of the vehicle suspension system 100, such that the drive wheels are arranged at a diagonally from each across the base frame 102. In some embodiments, the first wheel assembly 112 and the third wheel assembly 116 drive wheels are arranged on a same side of the vehicle suspension system 100. Still further, the first, second, third, and fourth-wheel assemblies 112, 114, 116, 118—however positioned relative to one another—may be configured for multi-directional movement (i.e., for those assemblies that are rotatable about vertical axes) and for bi-directional movement (i.e., for those assemblies that are not rotatable about vertical axes). So configured, the wheel assemblies 112, 114, 116, 118 enable the vehicle suspension system 100 and any vehicle it is incorporated into (see e.g., FIGS. 9A-B and vehicles 1000, 1100) to have no conventionally defined front or back surfaces or portions. Stated otherwise, the vehicle suspension system 100 and vehicles 1000, 1100 may be operated (i.e., maneuvered) in any direction without reference, per se, to a distinct front or back thereof.

At least one of the second wheel assembly 114 and the fourth wheel assembly 118 is a castor assembly that includes a wheel connected to a rotatable mount. The second wheel assembly 114 can include a second wheel 114a that is rotatably connected to a second swivel mount 114*b*, such that the second wheel 114*a* can rotate about a second horizontal axis. The second swivel mount 114*b* allows the second wheel 114*a* to swivel about a second vertical axis. The first wheel assembly 112 and the second wheel assembly 114 are arranged at opposite ends of the first rotatable frame 104. In some embodiments of the present disclosure, the fourth wheel assembly 118 similarly includes a fourth wheel 118*a* rotatably connected to a fourth swivel mount 118*b*, such that the second wheel 114*a* can rotate about a fourth horizontal axis. The fourth swivel mount 118*b* allows the fourth wheel 118*a* to swivel about a fourth vertical axis. In some embodiments, the third wheel assembly 116 and the fourth wheel assembly 118 are arranged at opposite ends of the second rotatable frame 106. In some embodiments, the third wheel assembly 114 and the fourth wheel assembly 118 drive wheels are arranged on a same side of the vehicle suspension system 100.

It should be appreciated that, in one or more embodiments, the first wheel assembly 112, the second wheel assembly 114, the third wheel assembly 116, and the fourth wheel assembly 118 can be any combination of drive wheel assemblies and/or castor assemblies. For example, one of the wheel assemblies 112, 114, 116, 118 can be drive wheel assemblies and the remaining wheel assemblies can be castor assemblies. As another example, three of the wheel assemblies 112, 114, 116, 118 can be drive wheel assemblies and the remaining wheel assembly can be a castor assembly.

The controller (not shown) can receive commands to cause the vehicle 1000 or 1100 to perform certain functions or tasks, such as move to a particular location. For example, in response to the controller receiving a destination command to cause the vehicle 1000 or 1100 to move to a particular destination (such as a particular location within a warehouse), the controller (not shown) in communication with a navigation system (not shown) generates a desired route to the destination. The vehicle 1000 or 1100 is equipped with sensors to help determine its location, for example, laser-based sensors (e.g., light detection and ranging (LIDAR)) (not shown) that detect a position based on signals reflected from the surface of the vehicle's environment. The vehicle 1000 or 1100 includes a transmitter for transmitting a signal, and a receiver (sensor) for receiving a reflected signal. In some embodiments, the sensor can detect signals reflected from pre-determined reflection points installed at an environment. The controller causes the motion of the vehicle 1000 or 1100 through vertical and horizontal rotation of the first wheel 112*a* and/or the third wheel 116*a* to guide the vehicle 1000 or 1100 along the route until such time that an obstacle impedes the route. In response to detection of the obstacle, the controller retrieves additional sensor data and generates an alternate route to circumvent the obstacle.

Figure 6:
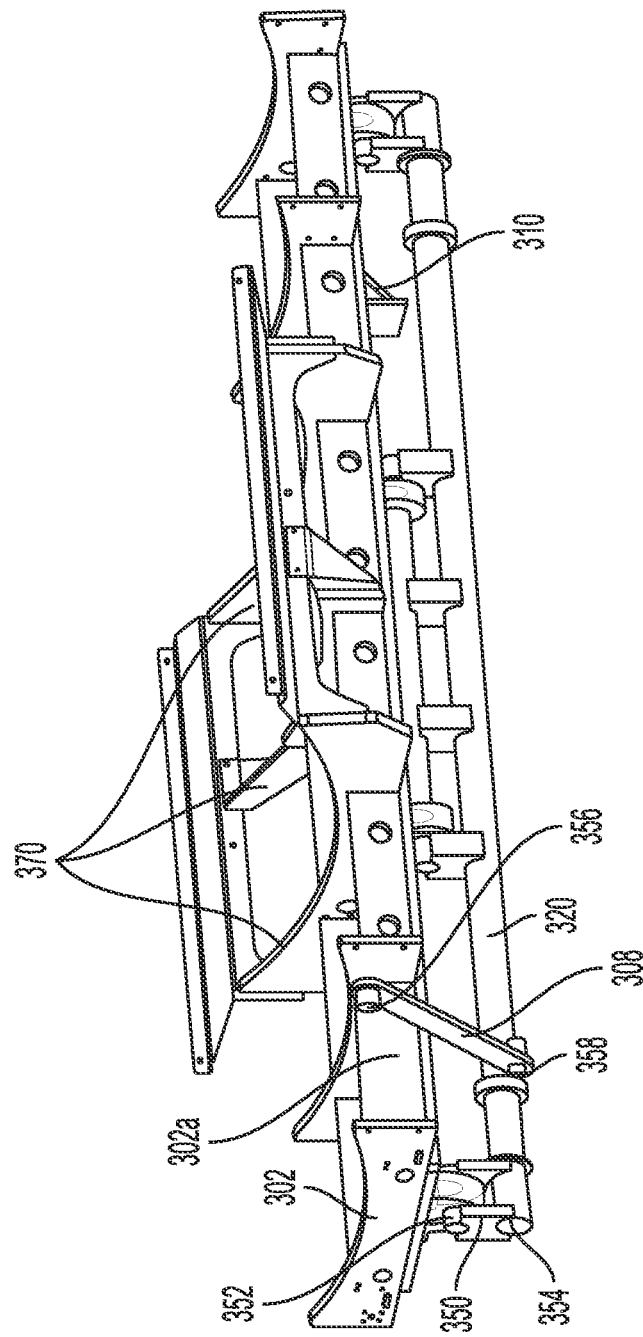
FIG. 6 illustrates a view of a base frame in communication with an axle member in accordance with one or more embodiments of the present disclosure.

Referring to FIG. 6, an embodiment of the base frame 302 is shown, for utilization with either vehicle 1000 or 1100. As illustrated, the base frame 302 includes multiple ribs 370 that each have an arcuate surface profile configured to receive load with an arcuate surface (e.g., a cylindrical load). It should be appreciated that other surface profiles other than the arcuate surface profile are possible. The base frame 302 is connected to an axle member 320 by a first base link 350, which is analogous to the first link 200*a* of FIG. 5A. The first base link 350 can rotate at a first brace joint 352. The first brace joint 352 includes a beam extending from the base frame 302 and into an opening in the first base link 350. The first base link 350 can also rotate at a second brace joint 354, in which a curvature of a surface profile of the first base link 350*c* conforms to a curvature of the axle member 320. The conformity of the curvature of the surface profiles allows the first base link 350 to rotate about the axle member 320. A first linkage bar 308 is connected to an extended member 302*a* of the base frame 302 at a fourth joint 356. The first linkage bar 308 is analogous to the third link 200*c* of FIG. 5A. The first linkage bar 308 can be connected to a first rotatable frame 304 at third joint position 358.

Figure 7:
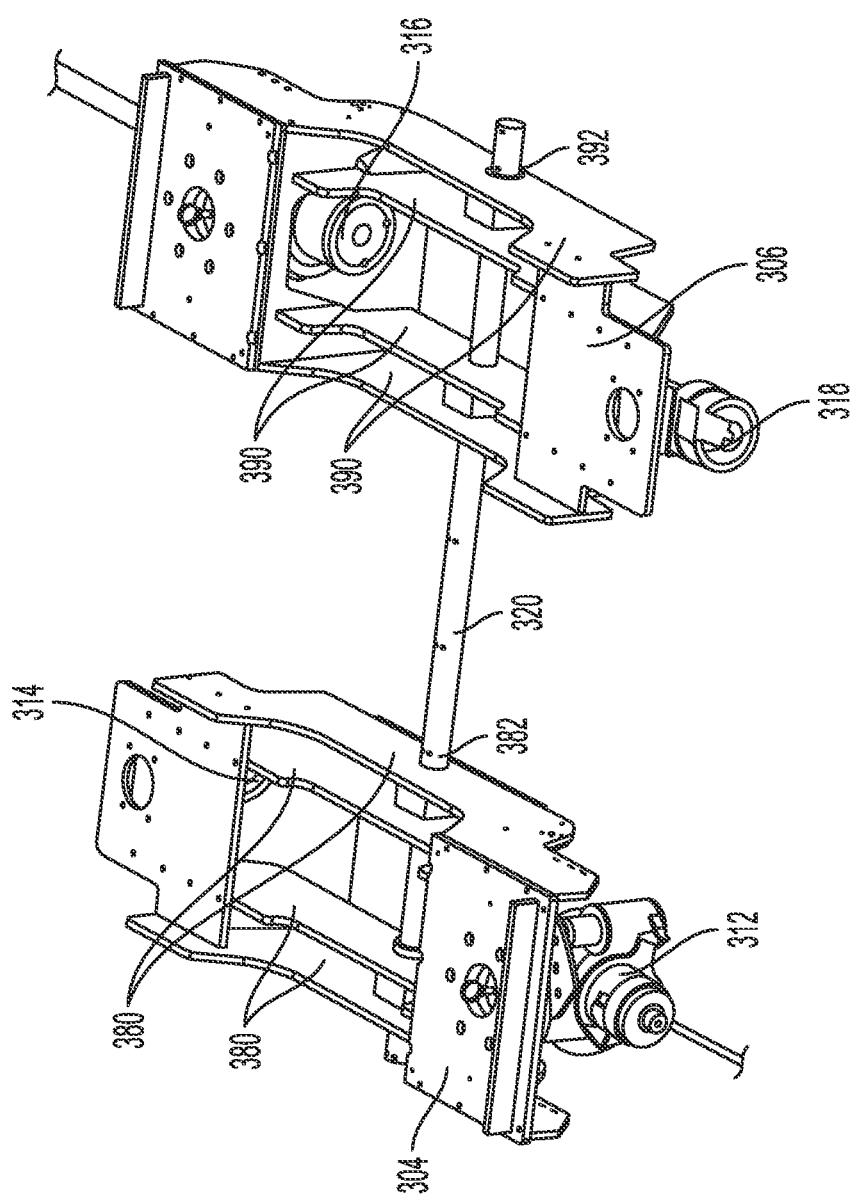
FIG. 7 illustrates a view of a first rotatable frame in communication with a second rotatable frame via an axle member in accordance with one or more embodiments of the present disclosure.

Referring to FIG. 7, a first rotatable frame 304 and a second rotatable frame 306 are engaged with the axle member 320, as may be utilized with either of vehicles 1000 or 1100 (see FIGS. 9A-12 elsewhere herein). The first rotatable frame 304 houses a first wheel assembly 312 and a second wheel assembly 314. The first rotatable frame 304 further includes multiple slats 380 that extend from the first wheel assembly 312 to the second wheel assembly 314 and each slat 380 includes an opening 382 for receiving the axle member 320. Each slat 380 further has a recessed profile to allow the arrangement of the base frame 302. The second rotatable frame 306 houses a third wheel assembly 316 and a fourth wheel assembly 318. The second rotatable frame 306 further includes multiple slats 390 that extend from the third wheel assembly 316 to the fourth wheel assembly 318, and each slat 390 includes an opening 392 for receiving the axle member 320. Each slat 390 further has a recessed profile to allow the arrangement of the base frame 302.

Figure 8:
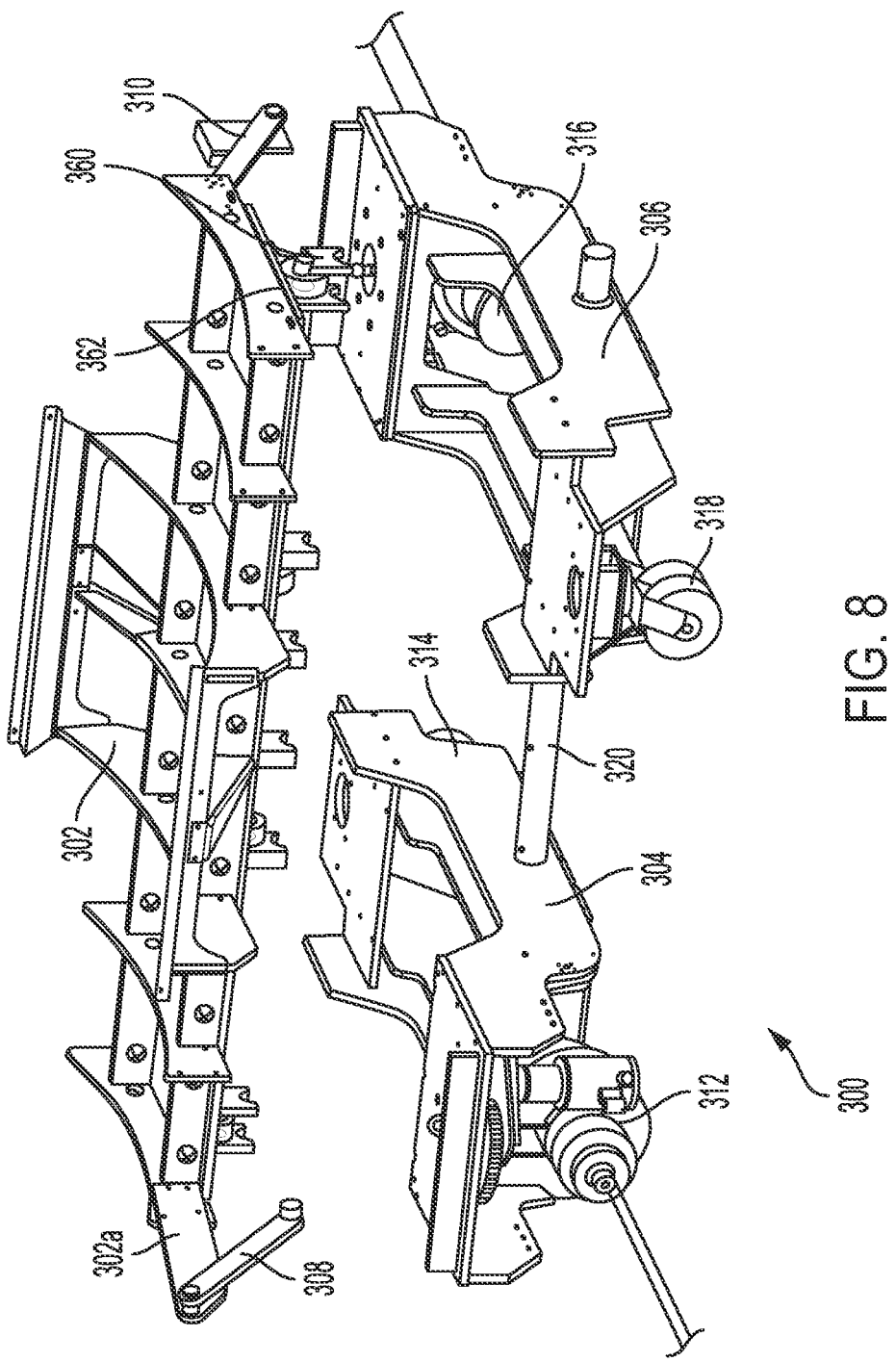
FIG. 8 illustrates a view of an exploded view of a vehicle suspension system in accordance with one or more embodiments of the present disclosure.

Referring to FIG. 8 an exploded view of an autonomous vehicle suspension system 300 is shown. As seen, the base frame 302 is connected to a second base link 360 at a third brace joint 362. The third brace joint 362 includes a beam extending from the base frame 302 and into an opening in the second base link 360. The second base link 360 can also rotate at a fourth brace joint (not illustrated as engaged), in which a curvature of a surface profile of the second base link 360 conforms to a curvature of the axle member 320. The conformity of the curvature of the surface profiles allows the first rotatable link to rotate about the axle member 320. A second linkage bar 310 is connected to the base frame 302 at a fourth joint 356. The first linkage bar 308 can be connected to a first rotatable frame 304 at third joint position 358. The base frame 302 has a surface configured to receive a weight bearing load. This autonomous vehicle suspension system 300 may further be utilized in conjunction with either of vehicles 1000 or 1100 (see FIGS. 9A-12 elsewhere herein).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagrams, or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A vehicle comprising:
a first rotatable frame comprising a first wheel assembly and a second wheel assembly;
a second rotatable frame comprising a third wheel assembly and a fourth wheel assembly;
a base frame configured to support a weight-bearing load; and
a single axle member engaging the first rotatable frame, the second rotatable frame, and the base frame, wherein the first rotatable frame is rotatable about the single axle member relative to the base frame and independent of the second rotatable frame, and the second rotatable frame is rotatable about the single axle member relative to the base frame and independent of the first rotatable frame.

2. The vehicle of claim 1 further comprising a first four-bar linkage system causing the base frame to be coupled to the first rotatable frame, wherein the first four-bar linkage system limits a rotation of the first rotatable frame about the axle member relative to the base frame.

3. The vehicle of claim 2 further comprising a second four-bar linkage system causing the base frame to be coupled to the second rotatable frame, wherein the second four-bar linkage system limits a rotation of the second rotatable frame about the axle member relative to the base frame.

4. The vehicle of claim 2, wherein at least one of: the first wheel assembly comprises a first drive wheel, or the first four-bar linkage system is arranged on the vehicle proximate to the first drive wheel.

5. The vehicle of claim 4, wherein at least one of: the third wheel assembly comprises second drive wheel or the second four-bar linkage system is arranged on the vehicle proximate to the second drive wheel.

6. The vehicle of claim 5, wherein the first drive wheel is arranged on the first rotatable frame at a diagonal position across the base frame from an arrangement of the second drive wheel on the second rotatable frame.

7. The vehicle of claim 1, wherein the axle member engages the first rotatable frame, the second rotatable frame, and the base frame along a longitudinal axis of the axle.

8. The vehicle of claim 1, wherein the axle member engages the first rotatable frame between the first wheel assembly and the second wheel assembly.

9. The vehicle of claim 1, wherein the base frame comprises an arcuate surface profile configured to receive a cylindrical weight-bearing load.

10. The vehicle of claim 1, further comprising a conveyor, wherein the base frame is configured to support the weight-bearing load via the conveyor.

11. The vehicle of claim 10, wherein the conveyor comprises an arcuate surface profile for securely supporting a cylindrical weight-bearing load received thereon.

12. A vehicle comprising:
a first rotatable frame comprising a first wheel assembly and a second wheel assembly;
a second rotatable frame comprising a third wheel assembly and a fourth wheel assembly;
a base frame configured to support a weight-bearing load;
a single axle member engaging the first rotatable frame, the second rotatable frame, and the base frame, wherein the first rotatable frame is rotatable about the single axle member relative to the base frame and independent of the second rotatable frame, and the second rotatable frame is rotatable about the single axle member relative to the base frame and independent of the first rotatable frame;
a receiver for receiving a signal; and
a controller for directing a movement of the first wheel assembly based at least in part on a signal received by the receiver, wherein the first wheel assembly comprises a first drive wheel.

13. The vehicle of claim 12, further comprising a first four-bar linkage system causing the base frame to be coupled to the first rotatable frame, wherein the first four-bar linkage system limits a rotation of the first rotatable frame about the axle member relative to the base frame.

14. The vehicle of claim 13, further comprising a second four-bar linkage system causing the base frame to be coupled to the second rotatable frame, wherein the second four-bar linkage system limits a rotation of the second rotatable frame about the axle member relative to the base frame.

15. The vehicle of claim 12, further comprising a transmitter for transmitting a signal, wherein the transmitter comprises a laser-based device mounted on the vehicle.

16. The vehicle of claim 15, wherein the receiver is configured to receive the signal, wherein the signal is transmitted by the transmitter and reflected from a target location.

17. The vehicle of claim 12, wherein at least one of: the third wheel assembly comprises a second drive wheel, the controller can further direct a rotation of the second drive wheel based at least in part on the signal received by the receiver, or the first drive wheel is arranged on the first rotatable frame at a diagonal position across the base frame from an arrangement of the second drive wheel on the second rotatable frame.

18. The vehicle of claim 12, wherein the base frame comprises an arcuate surface profile configured to receive a cylindrical weight-bearing load.

19. The vehicle of claim 12, further comprising a conveyor, wherein the base frame is configured to support the weight-bearing load via the conveyor.

20. The vehicle of claim 19, wherein the conveyor comprises an arcuate surface profile for securely supporting a cylindrical weight-bearing load received thereon.

* * * * *